Figure 1:
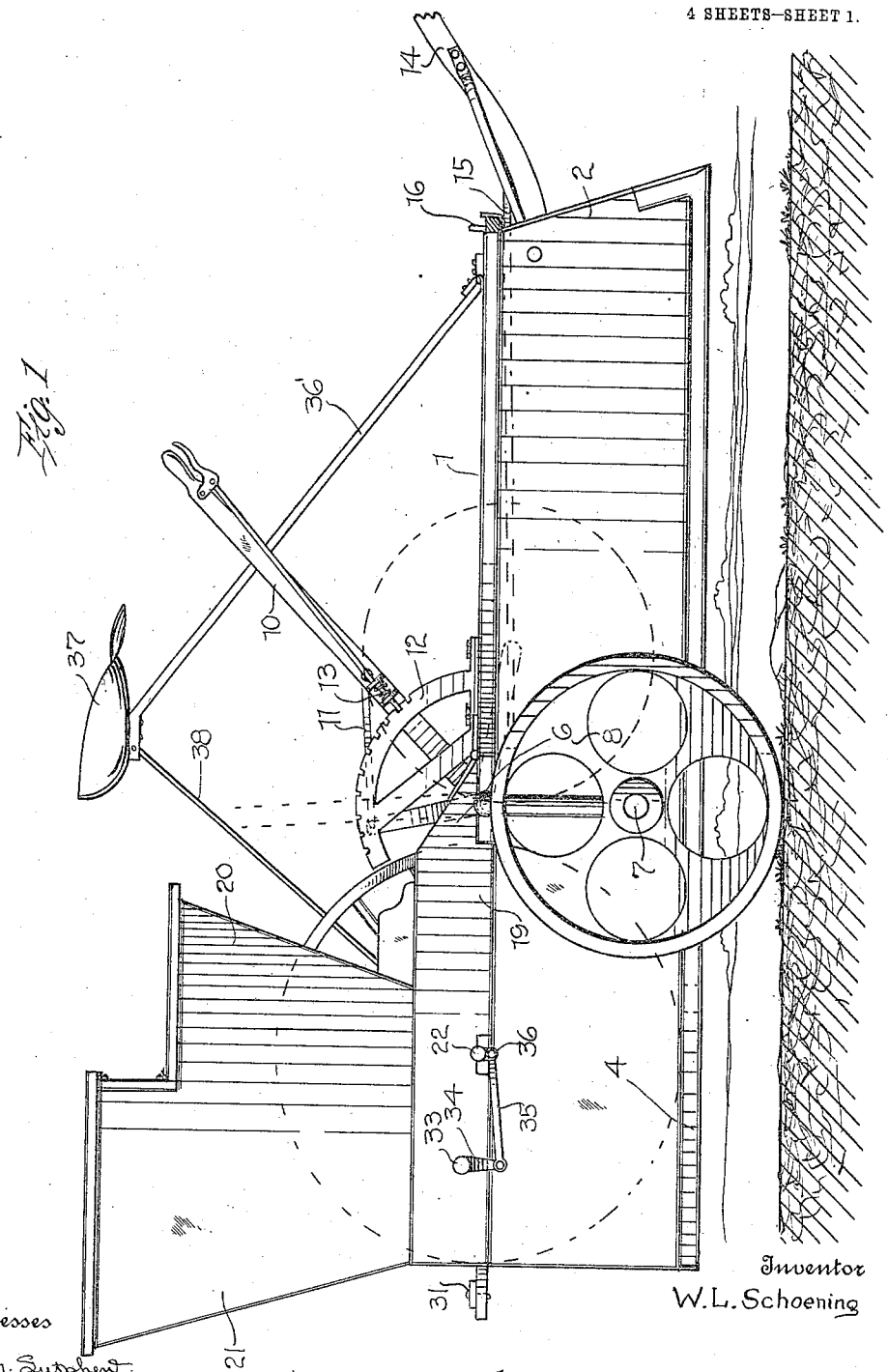

W. L. SCHOENING.
COMBINED PLANTER AND FERTILIZER DISTRIBUTER.
APPLICATION FILED JAN. 16, 1913.

1,074,749.

Patented Oct. 7, 1913.
4 SHEETS—SHEET 1.

Witnesses
Robert M. Sutphend
A. I. Hind

Inventor
W. L. Schoening
By Watson E. Coleman
Attorney

W. L. SCHOENING.
COMBINED PLANTER AND FERTILIZER DISTRIBUTER.
APPLICATION FILED JAN. 16, 1913.
1,074,749.
Patented Oct. 7, 1913.
4 SHEETS—SHEET 2.
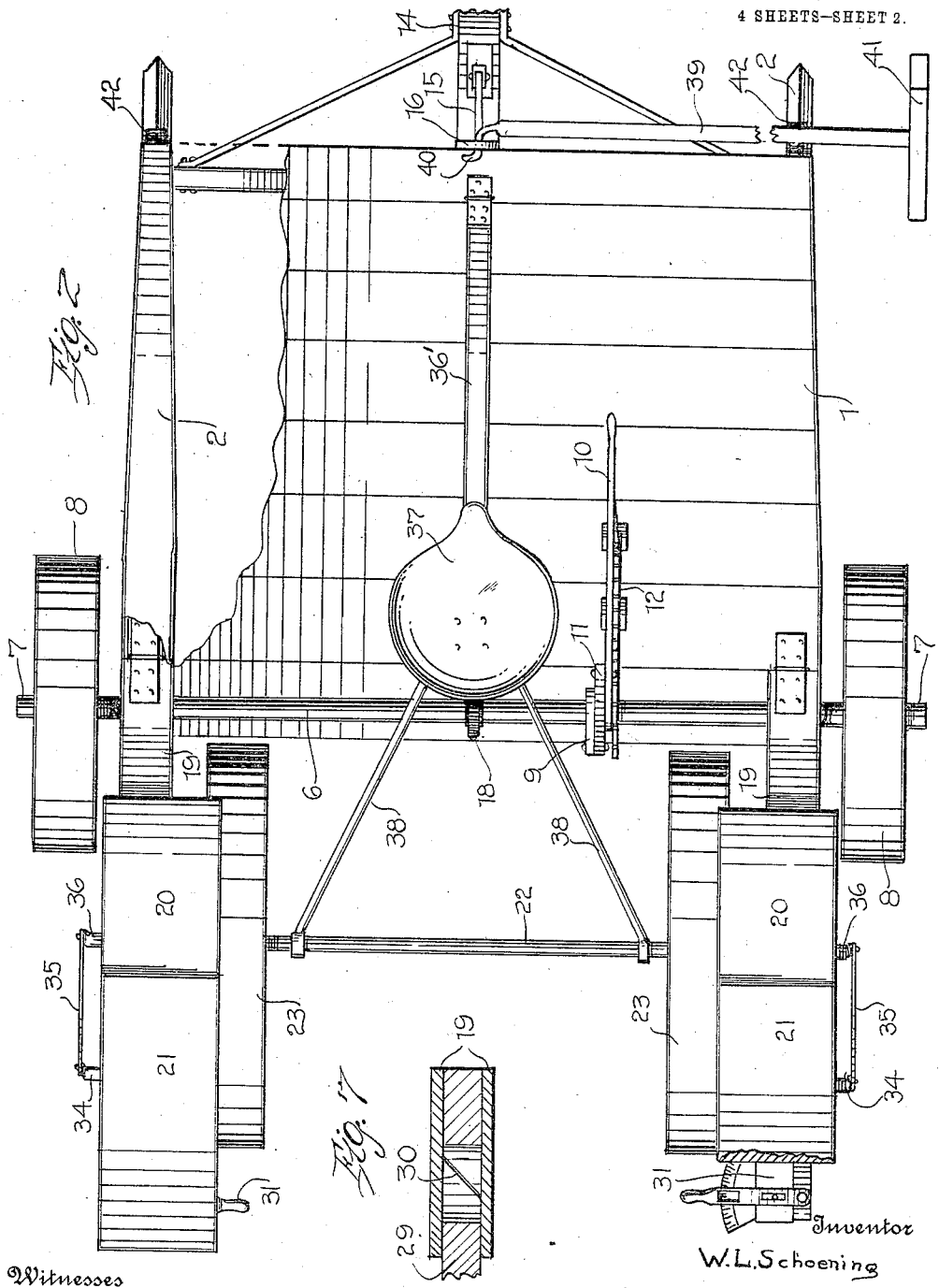

W. L. SCHOENING.
COMBINED PLANTER AND FERTILIZER DISTRIBUTER.
APPLICATION FILED JAN. 16, 1913.
1,074,749.
Patented Oct. 7, 1913.
4 SHEETS—SHEET 3.
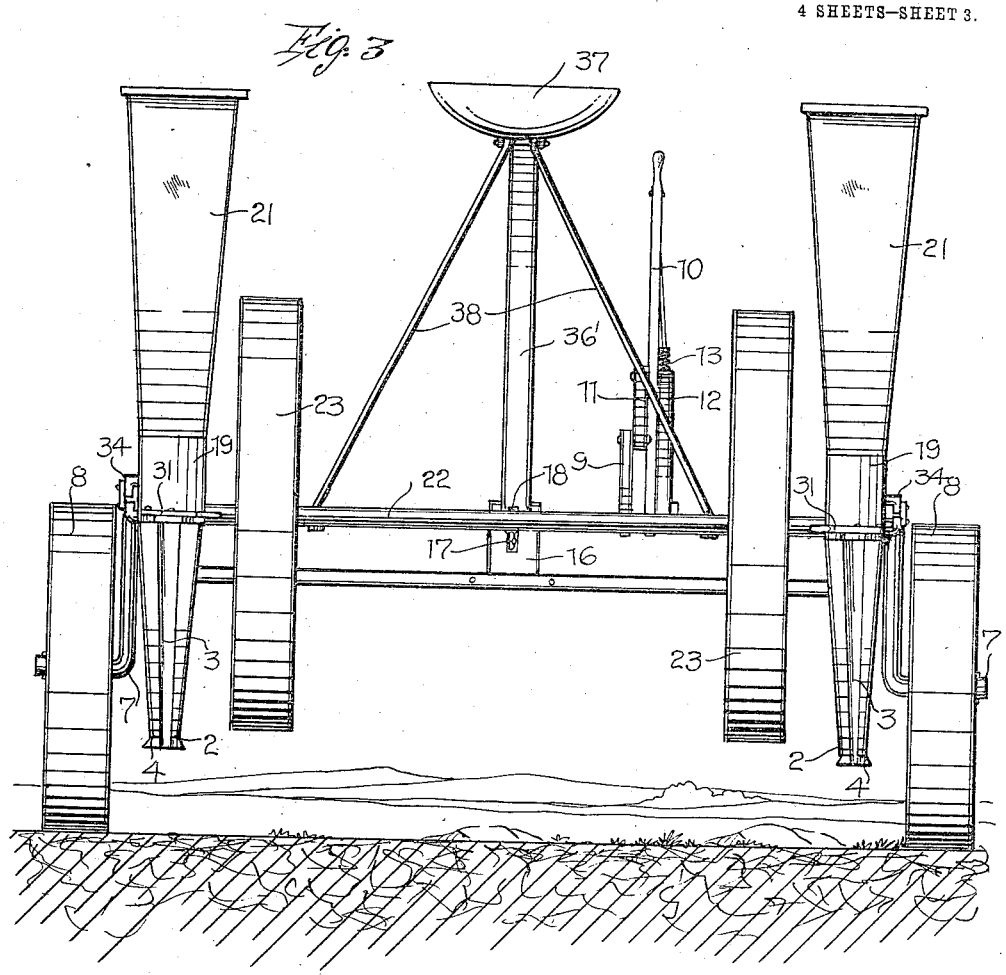
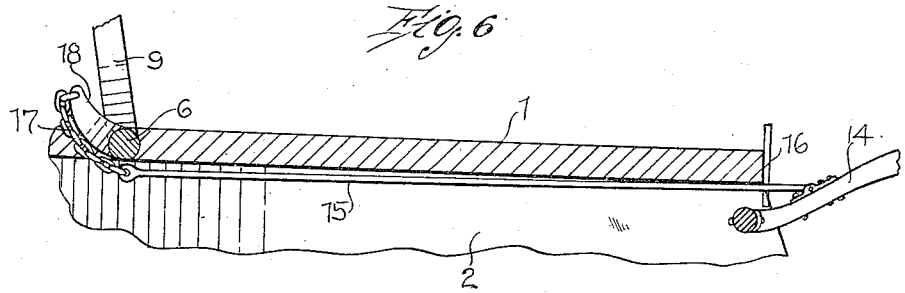
Witnesses
Robert M. Sutphen.
A. J. Hind.
Inventor
W. L. Schoening
By Watson E. Coleman
Attorney W. L. SCHOENING.
COMBINED PLANTER AND FERTILIZER DISTRIBUTER.
APPLICATION FILED JAN. 16, 1913.
1,074,749.
Patented Oct. 7, 1913.
4 SHEETS—SHEET 4.
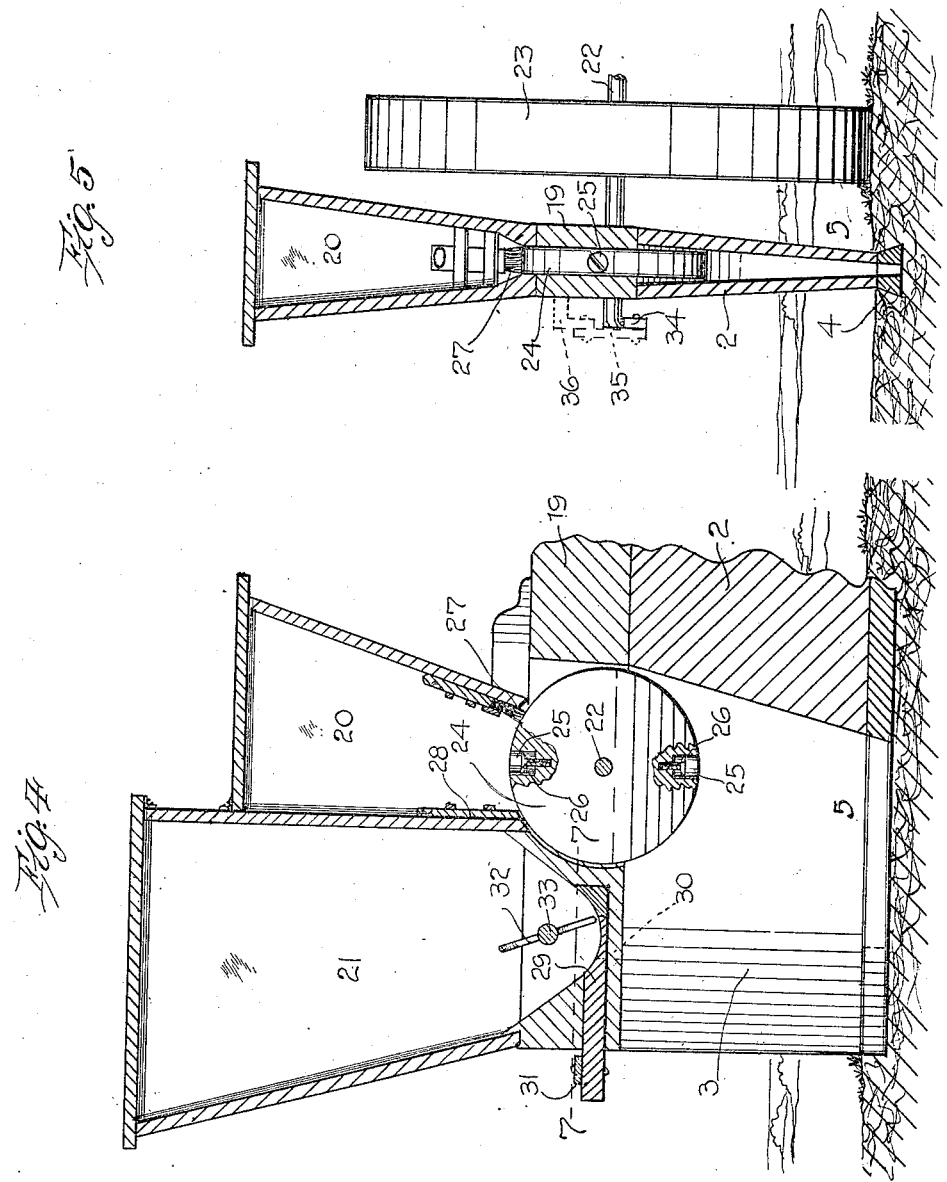

UNITED STATES PATENT OFFICE.

WILLIAM LOWRY SCHOENING, OF NEW MILLPORT, PENNSYLVANIA.

COMBINED PLANTER AND FERTILIZER-DISTRIBUTER.

1,074,749.  Specification of Letters Patent.  Patented Oct. 7, 1913.

Application filed January 16, 1913. Serial No. 742,500.

*To all whom it may concern:*

Be it known that I, WILLIAM L. SCHOENING, a citizen of the United States, residing at New Millport, in the county of Clearfield and State of Pennsylvania, have invented certain new and useful Improvements in Combined Planters and Fertilizer-Distributers, of which the following is a specification, reference being had to the accompany ing drawings.

This invention relates to new and useful improvements in combined planters and fertilizer distributers and the primary object of the invention is to provide a device of this character which will positively distribute the seed and fertilizer in the furrows formed, without scattering the same irregularly over the field.

A further object of the invention resides in providing improved means for gaging the depth at which the seed and fertilizer is to be planted below the surface of the ground and a still further object resides in hinging the dropping and driving mechanism there for on the main frame of the device.

Still another object of the invention resides in providing an improved tension device which is most effective when the supporting wheels are disposed to their lower most positions and a still further object resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of the device with the supporting wheels disposed to their lowered positions and showing in dotted lines these wheels in their raised position. Fig. 2 is a plan view of the device. Fig. 3 is a rear elevation thereof. Fig. 4 is a vertical longitudinal section through the device. Fig. 5 is a trans verse section through the device. Fig. 6 is a fragmentary longitudinal section through the device showing particularly the tension means thereon; and Fig. 7 is a horizontal section as seen on line 7—7, Fig. 4.

In describing my invention, I shall refer to the drawings in which similar reference characters designate corresponding parts throughout the several views and in which—

1 indicates a main frame which is supported on a pair of elongated boot-like runners 2, the latter being provided with the vertical channels or slots 3 which lead to the shoes 4 upon which said runners are mounted. These channels 3 in the runners 2 lead to similar longitudinal channels 5 in the shoes 4, whereby the seed and fertilizer may be distributed from the device.

Mounted to oscillate in bearings on the frame 1, is a shaft or axle 6, the ends of which are bent in crank-like design to form axle stubs 7 and rotatably mounted on the latter are the supporting wheels 8. Formed on the shaft or axle 6, adjacent one end thereof, is an upstanding arm 9, and fulcrumed on the frame 1, adjacent this shaft or axle is a lever 10 which has connection with said arm 9 through the medium of a linking arm 11. A segmental rack 12 is also mounted on the frame 1, adjacent the lever and a spring detent 13 carried on said lever is adapted to engage the pivot thereon, whereby said lever may be retained in any adjusted position so as to correspondingly retain the runners in various adjusted positions with respect to the surface of the ground.

Connected to the forward end of the frame 1, intermediate of the runners, is the usual draft tongue 14 and pivotally connected therewith and extending rearwardly therefrom, under portions of the frame 1, is a rod 15. A guide plate or the like 16 is carried on the forward end of said frame 1, through the lower end of which this rod 15 extends and the rear end of this rod has engaged therewith a flexible connection 17, such as a chain or the like. An upwardly curved arm 18 is also formed on the shaft or axle 6 intermediate of its ends, with which this connection 17 is engaged. In view of the particular position of the axle and wheels, on the machine, the latter would, under ordinary conditions, have a tendency to dip downward at one end or the other, when said wheels are disposed into engagement with the ground. Being equipped with such a connection, between the tongue and arched axle, which forms a tension means therebetween, the rear end of the tongue and the forward end of the frame are forced somewhat downward, upon the disposition of the wheels downward into engagement with the ground, thus retaining the complete machine substantially level and preventing a pivot motion of said tongue with respect to the frame. As soon as the wheels are raised, however, this tongue is released and the pivot motion between the tongue and frame is then permissible and the device may then readily ride over uneven ground during the propulsion thereof. This tension device is so arranged that it also limits the movement of the lever 10 in a forward direction, thereby permitting the downwardly bent portions of the axle or shaft 6 to be disposed in a substantially vertical position when said lever is in its foremost position.

Hingedly mounted on the frame 1 above each of the runners 2 is a channel-like frame or base member 19, the base of which is slotted to aline with the channel 3. Carried on each of the base members 19, is a pair of hoppers 20 and 21, the former being a seed hopper and the latter a fertilizer hopper and rotatably supported between the two base members or frames 19, is an additional shaft or axle 22. This shaft or axle 22 carries thereon a pair of drive wheels 23, the plane of the tread of said wheels being slightly above the plane of the shoes 4 on said runners. Also carried on the shaft or axle 22 to rotate therewith are the feed wheels 24, one being provided for each of the pair of hoppers 20, said feed wheels being so disposed as to have portions thereof within said last mentioned hoppers and the remaining portions thereof disposed in the upper portions of the channels 3 in said runners. The periphery of each wheel is provided at diametrically opposite points thereon with cavities or recesses 25 and adjusting screws 26 which are mounted in the bases of these recesses, permit the regulation of the amount of grain to be engaged thereby. The end walls of both hoppers are, of course, inclined toward their lower ends so as to direct the contents thereof downwardly and the one wall of each of the hoppers 20 is provided with a brush 27, the bristles of which are adapted to engage the periphery of the feed wheel, for obvious purposes. The opposite wall of each of said hoppers 20 is provided with a slide 28.

The fertilizer hoppers 21 are each provided with a sliding bottom 29 which is provided with a diagonal slot 30, the latter also leading to the channel 3 in the adjacent runner. These slides 29 are adjustable through the medium of the adjusting means 31 for the purpose of regulating the amount of fertilizer to be distributed and oscillatingly mounted between the walls of the hoppers 21 adjacent the bottom thereof, are the beaters or vibrating members 32. These vibrating members of each hopper 21, are carried on shafts 33, the one end of each of which is bent to form a crank 34, and pivotally engaged with this crank is a pitman or vibrating rod 35, which also has pivotal connection with an additional crank 36 on the end of the shaft or axle 22. From this construction, it will be seen that as the shaft or axle 22 is rotated, the feed wheels 24 will be correspondingly rotated therewith to drop the contents of the hopper 20 through the channels of the runners 2 and simultaneously the vibrators 32 will be oscillated to cause the fertilizer in the hoppers 21 to be distributed through the channels of the runners. As the device is propelled, the seed which is dropped through the channels of the runners and through the channels of the shoes, will, of course, be covered by the fertilizer.

Hingedly mounted on the forward end of the frame 1, is a bracing rod or arm 36′ which is inclined upwardly and has the upper end of the same rigidly connected to a seat 37. Also hingedly connected to this seat are the additional and rearwardly inclined bracing arms 38, the lower ends of the latter being connected to bearings on the rear shaft or axle 22. From this construction, it will be seen that the complete dropping mechanisms which include the base members 19, the hoppers, the shaft 22 with the drive wheels 23 thereon may be raised together with the seat 37. This is for two purposes i. e. to permit the hoppers to be emptied when desired, and also to permit the drive wheels and parts carried thereby to be raised, when said drive wheels meet obstructions in the path of travel, without affecting the supporting wheels and other parts of the device. I have also provided a marking attachment which comprises an arm 39, the inner end of which is compoundly curved to form a substantial gooseneck or the like 40, while the outer end thereof has a marker 41 secured or otherwise carried thereon. This goose-neck inner end 40 is adapted to be received in an opening in the plate 16 and supporting keepers or the like 42 are carried on the forward ends of the runners 2 to support the arm 39 in its inoperative position. This arm is shown in its supported and inoperative position in Fig. 2 of the drawing and when it is desired to allow the same to be operatively disposed, said arm is removed from the support and allowed to drop downwardly in front of one runner so that the marker 41 thereon will actually contact with the surface of the ground. The goose-neck inner end of the arm will, at all times, be held in the plate 16 and said arm will contact with the forward end of the runner as the device is propelled. It is obvious that in view of the construction shown, the marker may be turned to project on either side of the device.

In operation, assuming that the supporting or ground wheels 8 are in their lowermost positions, and the drive wheels 23 raised above the surface of the ground, should it be desired to place the dropping mechanisms in operation, the operator grasps the lever 10 and draws the same rearwardly. With this operation, the wheels 8 will be thrown forwardly and the same are disposed to such positions as will allow the shoes on the runners to operate at the desired depth. This depth will, of course, be indicated to the operator and when the wheels are adjusted properly, the detent 13 is engaged with the teeth of the rack 12. In this position, as the device is propelled, the drive wheels 23 will be rotated to correspondingly rotate the shaft 22. With the rotation of this shaft, it is obvious that the seed from the hoppers 20 and the fertilizer from the hoppers 21 will be dropped through the channels 3 of the runners, and through the channels 5 of the shoes into the furrows formed. In the course of travel, should the drive wheels 23 meet obstructions, the same would rise upwardly and ride thereover, carrying with the same the parts on the shaft 22 and in this manner, the supporting wheels and the depth with which the runners are operating, will not be affected. When the device has reached the one end of the field, and it is desired to turn the same, the lever 10 is again thrown to its forward position thereby disposing the ground wheels 8 in their lowermost positions to cause the drive wheels to be raised above the surface of the ground. The forward movement of the lever 10 will be limited through the medium of the tension rod 15 and the tension chain 17 and through this latter means, all possible jerking of the lever 10 as the device is now propelled, will be obviated. This tension means will also form a bracing means for the central portion of the frame and runners as the device is supported on these wheels 8, and the same also draws the forward end of the frame and the tongue downwardly when effectively disposed.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. In a planter, the combination with a main frame supported on runners, portions of said runners being provided with vertical slots, an axle mounted on said main frame, and supporting wheels carried on the axle; of slotted members hinged on said main frame and adapted to rest on portions of said runners, said hinged members being provided with longitudinal slots alining with the slots of said runners, hoppers carried on said hinged members, dropping mechanisms for said hoppers operatively mounted on the hinged members to convey the contents of the hoppers to the slots of said runners, and means for operating said mechanisms as the device is propelled.

2. In a planter, the combination with a main frame mounted on runners, portions of said runners being provided with vertical longitudinal slots, an axle carried on said main frame, and supporting wheels mounted on the axle; of slotted members hinged on said main frame and resting on portions of the runners, the slots of said hinged members alining with the slots of said runners, a rotatable shaft supported between said hinged members, dropping mechanisms for the hoppers mounted in the hinged members in connection with said rotatable shaft, and means carried on said shaft adapted to contact with the surface of the ground as the device is propelled for operating said dropping mechanisms.

3. In a planter of the class described, the combination with a main frame mounted on runners, portions of said runners being provided with vertical longitudinal slots, and means to raise and lower the runners and frame with respect to the ground; of a pair of slotted members hinged to said main frame and resting on portions of said runners, the slots of said hinged members alining with the slots of said runners, hoppers mounted on said slotted members, dropping mechanisms for the hoppers carried on said slotted members to conduct the contents of said hoppers into the slots of said runners, and means adapted to operate said dropping mechanisms when the device is propelled and the runners in engagement with the ground.

In testimony whereof I hereunto affix my signature in the presence of two witnesses.

WILLIAM LOWRY SCHOENING.

Witnesses:
E. M. McCREERY,
B. S. P. PRUP.